(12) United States Patent
Carriot

(10) Patent No.: US 7,073,641 B2
(45) Date of Patent: Jul. 11, 2006

(54) BRAKING SYSTEM WITH SAFE TORQUE TAKE-UP

(75) Inventor: Pascal Carriot, Le Mas (FR)

(73) Assignee: Moteurs Leroy-Somer, Angouleme (FR)

(*) Notice: Subject to any disclaimer, the term of this patent is extended or adjusted under 35 U.S.C. 154(b) by 0 days.

(21) Appl. No.: 10/872,372

(22) Filed: Jun. 22, 2004

(65) Prior Publication Data

US 2005/0011707 A1    Jan. 20, 2005

(30) Foreign Application Priority Data

Jul. 8, 2003    (FR)    ................... 03 08362

(51) Int. Cl.
*B60T 13/04*    (2006.01)
*B60L 7/00*    (2006.01)

(52) U.S. Cl. .................. 188/171; 188/161; 188/71.5

(58) Field of Classification Search ............... 188/158, 188/161, 163, 171, 173, 156, 157, 159, 162, 188/71.4, 71.5; 192/90
See application file for complete search history.

(56) References Cited

U.S. PATENT DOCUMENTS

| | | | | |
|---|---|---|---|---|
| 3,608,679 A | * | 9/1971 | Harrison | ................... 188/171 |
| 4,142,610 A | * | 3/1979 | Alexander et al. | .......... 188/171 |
| 5,057,728 A | * | 10/1991 | Dammeyer et al. | ......... 188/171 |
| 5,186,286 A | * | 2/1993 | Lindberg | ................... 188/171 |
| 6,129,184 A | * | 10/2000 | Ferrand et al. | ............. 188/170 |
| 6,237,730 B1 | * | 5/2001 | Dropmann et al. | ......... 188/171 |
| 6,439,355 B1 | * | 8/2002 | Kimble | ....................... 188/171 |

FOREIGN PATENT DOCUMENTS

| | | | |
|---|---|---|---|
| DE | 1 292 735 | | 4/1969 |
| EP | 9 298 403 A2 | | 1/1989 |
| FR | 2.037.238 | | 12/1970 |
| JP | 62020922 A | * | 1/1987 |
| JP | 2000-35064 A | | 2/2000 |

* cited by examiner

*Primary Examiner*—Thomas J. Williams
(74) *Attorney, Agent, or Firm*—Oliff & Berridge, PLC

(57) ABSTRACT

The present invention relates to a braking system for an electric motor, the braking system comprising:
  a chassis; and
  at least one brake supported by the chassis, the brake comprising:
    at least one brake disk connected via a fluted connection to a shaft driven by the motor;
    an armature that is movable in translation along an axis of rotation of the shaft;
    a plurality of armature-guiding spacers, at least one of the spacers being engaged at one end in a corresponding housing in the chassis, so as to enable the chassis to take up torque that is exerted on the brake during braking;
    a plurality of springs for urging the armature against the disk; and
    an electromagnet which, when powered, attracts the armature and moves it away from the disk against the action of the springs.

12 Claims, 2 Drawing Sheets

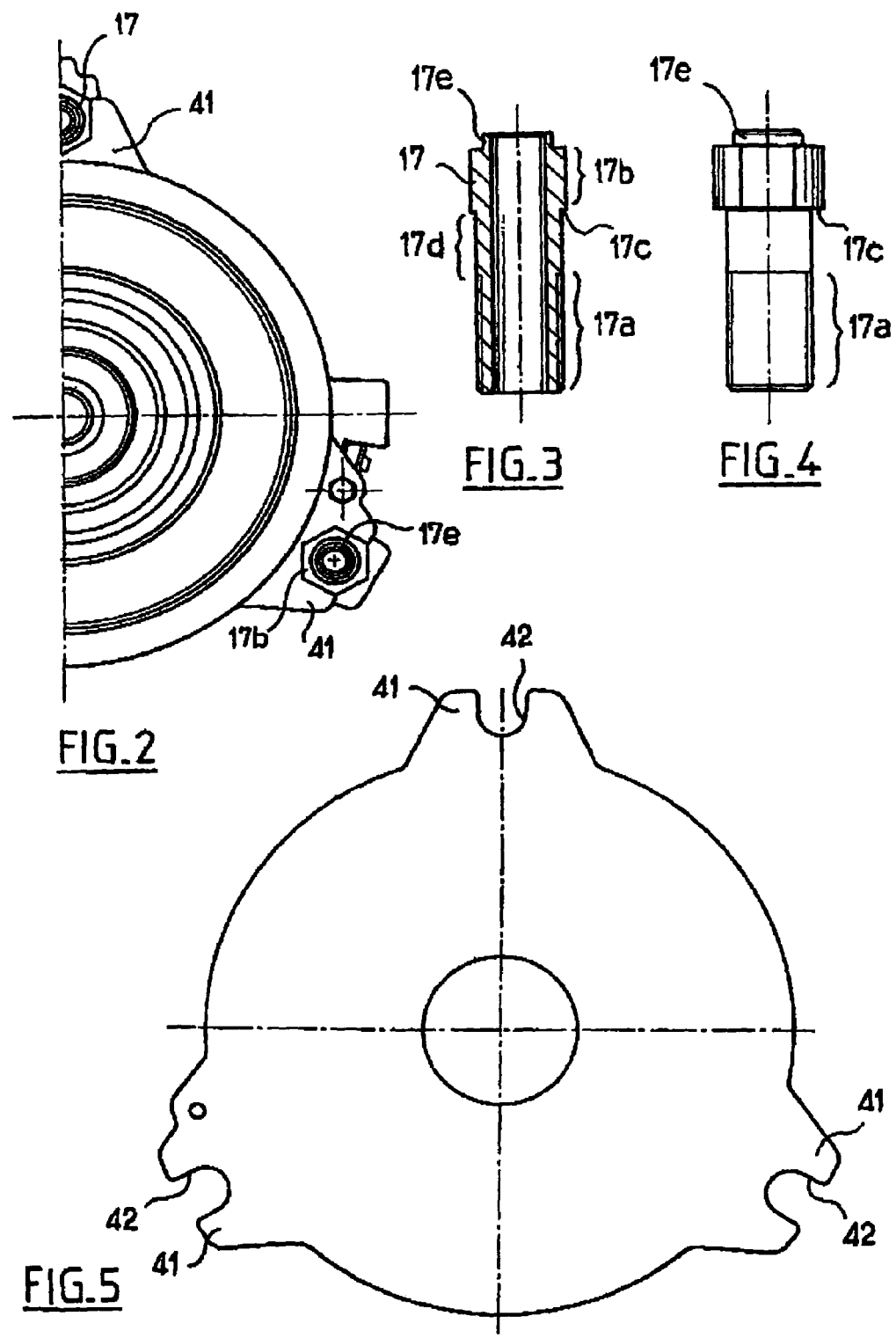

BRAKING SYSTEM WITH SAFE TORQUE TAKE-UP

This non provisional application claims the benefit of French Application No. 03 08362 filed on Jul. 8, 2003.

The present invention relates to braking systems for electric motors, and particular to those for use with motors driving elevators or other hoist systems.

BACKGROUND OF THE INVENTION

Braking systems are known which comprise electromagnetic brakes each comprising a brake disk secured to the motor shaft and provided with friction linings, together with an armature that is movable under drive from an electromagnet. If the electromagnet is not excited, then the armature is pressed against the friction linings by springs, so braking torque is exerted on the disk, and by reaction also on the brake and the chassis supporting it.

Brakes are conventionally assembled by being bolted onto the chassis, with braking torque being taken up by the chassis by the friction due to the bolts being tightened.

Screw-tightened assemblies suffer from a large amount of dispersion in characteristics, which makes it necessary to overdimension the braking system by using more screws and/or stronger materials, and this has repercussions on costs.

There exists a need for a braking system that presents the required level of safety, while enabling it to be manufactured at lower cost.

BRIEF SUMMARY OF THE INVENTION

In a first aspect, the invention thus provides a braking system for an electric motor, in particular for driving an elevator, the braking system comprising:
  a chassis; and
  at least one brake supported by the chassis, the brake comprising:
    at least one brake disk connected via a fluted connection to a shaft driven by the motor;
    an armature that is movable in translation along the axis of rotation of the shaft;
    armature-guiding spacers, at least one of the spacers being engaged at one end in a corresponding housing in the chassis, so as to enable the chassis to take up the torque that is exerted on the brake during braking;
    springs for urging the armature against the disk; and
    an electromagnet which, when powered, serves to attract the armature and move it away from the disk against the action of the springs.

The brake may include, in particular, three spacers each having one end engaged in a corresponding housing of the chassis so as to enable the chassis to take up the torque that is exerted on the brake during braking.

Such a braking system enables the braking torque to be taken up reliably and safely without it being necessary to overdimension the brake, by making the spacers perform an additional function, namely that of transmitting the braking torque.

In a particular embodiment, the armature includes at least one oblong opening that is elongate in the radial direction and through which a corresponding spacer passes. This oblong opening may, in particular, open out into the circumference of the armature. The presence of the oblong opening makes it easier to position the armature on the spacer and makes it possible to make the braking system with looser manufacturing tolerances, and thus at lower cost.

Each spacer may be screwed into a yoke of the brake, thus enabling the axial travel of the armature to be adjusted, with the armature, in the absence of power being supplied to the electromagnet, being pressed by the springs against a head of the spacer, which head may be hexagonal in shape so as to make the spacer easier to tighten or loosen.

Advantageously, the braking system includes a second brake juxtaposed with the first brake, and comprising like the first brake, a brake disk connected via a fluted connection to the shaft that is driven by the motor, an armature that is movable in translation along the axis of rotation of the shaft, armature-guiding spacers, springs for urging the armature against the disk, and an electromagnet which, when powered, serves to attract the armature and move it away from the disk against the action of the springs.

Where appropriate, each of the spacers of the second brake may be engaged at one end in a corresponding housing in the yoke of the first brake, so as to enable said yoke to take up the torque that is exerted on the second brake during braking.

The braking system may include threaded rods passing through the spacers and holding the two brakes pressed one against the other. These threaded rods may be screwed at one end into the chassis and may serve at their opposite ends to receive nuts that are screwed on to bear against the yoke of the second brake.

The yoke may include a housing for receiving one end of the shaft driven by the motor, which housing may be closed at one end by a plug serving to reduce the operating noise of the braking system.

BRIEF DESCRIPTION OF THE DRAWINGS

The invention can be better understood on reading the following detailed description of non-limiting examples thereof, and on examining the accompanying drawings, in which:

FIG. 2 is a front half-view of the left-hand brake in FIG. 1, with the chassis removed;

FIG. 3 is an axial section view showing, in isolation, a spacer of the left-hand brake in FIG. 1;

FIG. 4 is an elevation view of the FIG. 3 spacer;

FIG. 5 is a face view showing, in isolation, the armature of the left-hand brake in FIG. 1.

MORE DETAILED DESCRIPTION

Figure 1:
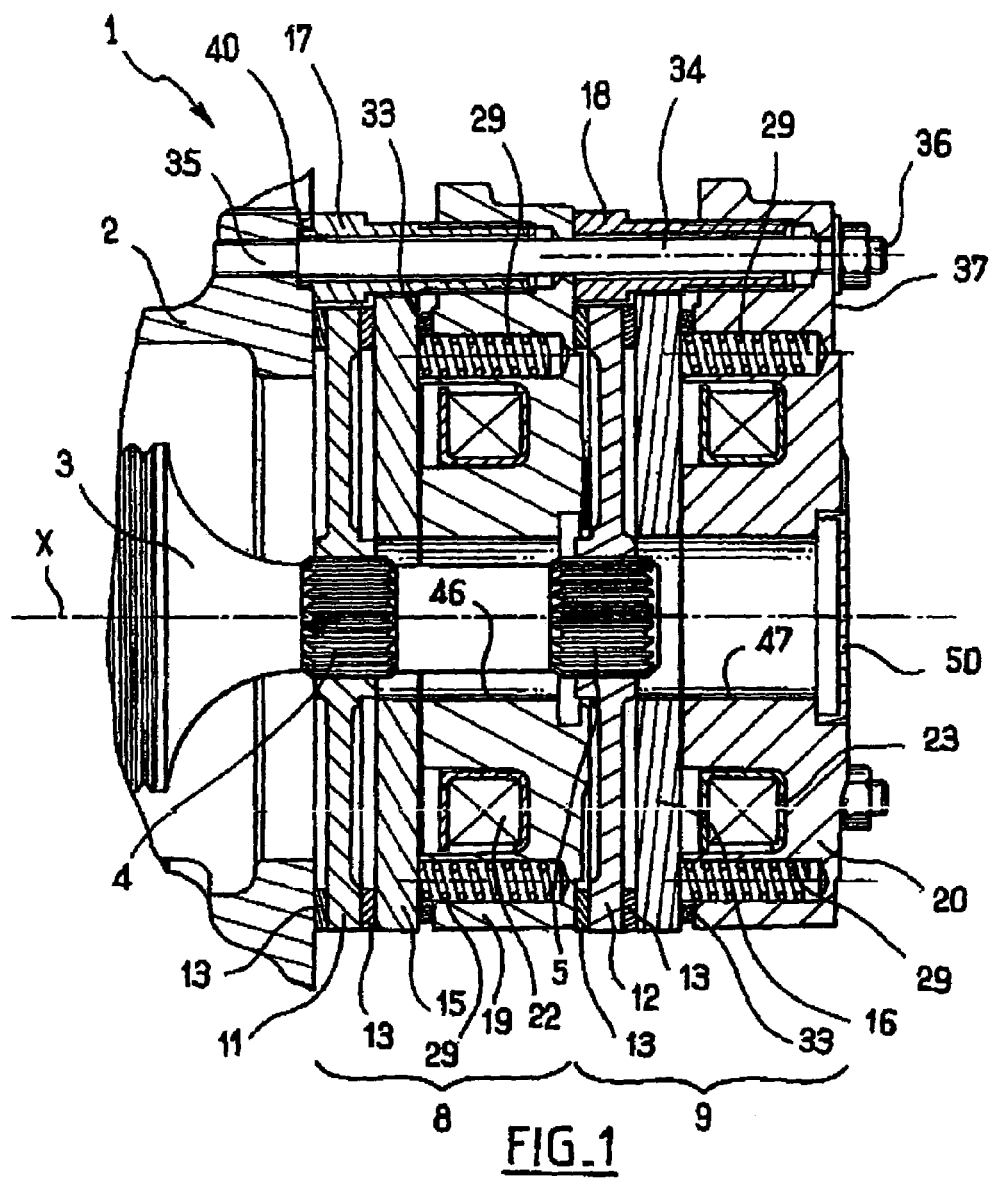
FIG. 1 is a diagrammatic and fragmentary axial section view of a braking system made in accordance with the invention.

The braking system 1 shown in FIG. 1 comprises a chassis 2 that is shown in part, and that is secured to a main structure (not shown). Inside the chassis 2, there rotates a shaft 3 of axis X carrying a pulley for driving an elevator cable. The shaft 3 has two fluted portions 4 and 5 at one end.

In the example described, the braking system also comprises two brakes 8 and 9 each comprising respective brake disks 11 and 12 provided with hubs that are capable of sliding over the respective fluted portions 3 and 4 along the axis X of the shaft, while rotating therewith.

The brakes 11 and 12 are provided at their peripheries and on both faces with friction linings 13.

The brakes 8 and 9 also comprise respective moving armatures 15 and 16 which are guided in their movement in translation along the axis X by spacers 17 for the first brake and 18 for the second brake, these spacers 17 and 18 being screwed into the respective yokes 19 and 20 of the brakes 8 and 9.

Electromagnets 22 and 23 housed respectively in the yokes 19 and 20 of the brakes 8 and 9 enable the corresponding armatures 15 and 16 to be attracted thereto when they are powered electrically, in with case the brake disks associated with said armatures can rotate without significantly braking rotation of the shaft 2.

Springs 29 are located in housings in the yokes 19 and 20 to press the armatures 15 and 16 against the corresponding brake disks 11 and 12 when the electromagnets 22 and 23 are not powered, so that the friction linings 13 then rub against the armature 15 and the chassis 2 for the first brake 8 and against the armature 16 and the yoke 19 for the second brake, thereby exerting braking torque on the shaft 3.

An O-ring 33 is disposed on each yoke 19 or 20 so as to be elastically interposed relative to the corresponding armature when the associated electromagnet is powered, for the purpose of reducing vibration and noise due to brake operation.

As can be seen in FIG. 3 in particular, the spacers 17 are hollow as are the spacers 18, thus enabling rods 34 to pass for fixing the brakes 8 and 9 to the chassis 2. These rods 34 extend parallel to the axis X and are screwed at one end 35 into the chassis 2 and each of them receives at its opposite end 36 a nut that bears against the rear face 37 of the yoke 20 of the second brake 9. Fixing systems other than rods 34 could also be used.

The spacers 17 present respective threaded portions 17a for screwing into the yoke 19 and respective hexagonal heads 17b which define respective shoulders 17c. By tightening the spacers 17 to a greater or lesser extent, it is possible to vary the air gap of the brake 8.

The spacers 17 present respective intermediate portions 17d that are circularly cylindrical and smooth, extending between the corresponding head 17b and threaded portion 17a, and serving to guide the armature 15.

In accordance with an aspect of the invention, each of the spacers 17 has an annular lip 17e projecting beyond the hexagonal head 17b and arranged to be received in a corresponding housing 40 in the chassis 2, so as to enable the braking torque exerted on the brakes 8 and 9 to be transmitted to the chassis 2.

In the example of FIG. 1, the spacers 18 differ from the spacers 17 solely by the absence of the lips 17e.

In another aspect of the invention, each armature 15 or 16 includes at its periphery and as can be seen in FIG. 5, three forks 41 disposed at 120° from one another, each presenting an oblong opening 42 for passing the corresponding spacer 17 or 18, the width of each opening 42 corresponding substantially to the outside diameter of the intermediate cylindrical portion 17d.

In the example shown, the oblong openings 42 open out radially to the outside of the corresponding armature 15 or 16, thus making it possible to accommodate a certain amount of radial movement of the spacers 17 and 18, thereby facilitating fabrication and assembly of the brakes 8 and 9.

The yokes 19 and 20 include respective housings 46 and 47 for passing the shaft 3. A plug 50 closes the housing 47 in the yoke 20, thus making it possible to reduce noise in operation.

Figure 6:
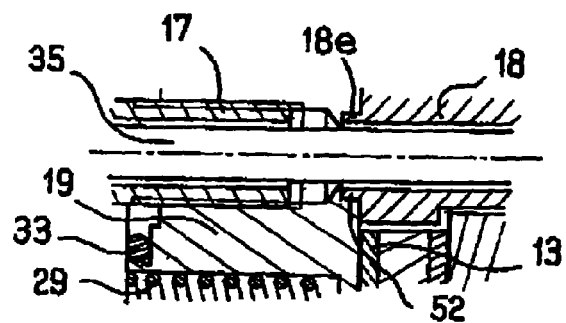
FIG. 6 is a fragmentary and diagrammatic view showing a detail of a variant embodiment of the braking system.

It would not go beyond the ambit of the present invention for the spacers 18 of the second brake to be identical to those of the first brake, and consequently for each of them to include an extension formed by an annular lip 18e (as shown in part and diagrammatically in FIG. 6) for engaging in a corresponding setback 52 in the yokes 19 of the first brake 8, so as to enable torque to be taken up between the two brakes 8 and 9 other than by friction, and thus further improve the safety of the assembly.

Naturally, the invention is not limited to the examples described above.

In particular, the spacers can be given different shapes, and where appropriate it is possible to provide a braking system having a different number of brakes.

Throughout the description, including in the claims, the term "comprising a" should be understood as being synonymous with "comprising at least one", unless specified to the contrary.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A braking system for an electric motor, the braking system comprising:
   a chassis; and
   at least one brake supported by the chassis, the brake comprising:
   at least one brake disk connected via a fluted connection to a shaft driven by the motor;
   an armature that is movable in translation along an axis of rotation of the shaft;
   a plurality of armature-guiding spacers, at least one of the spacers having a shoulder and an annular lip projecting beyond the shoulder, wherein the lip is received in a corresponding housing in the chassis and the shoulder comes into abutment against the chassis, so as to enable the chassis to take up torque that is exerted on the brake during braking, and each spacer is screwed into a yoke of the brake;
   a plurality of springs for urging the armature against the disk; and
   an electromagnet which, when powered, attracts the armature and moves it away from the disk against the action of the springs.

2. A system according to claim 1, wherein the armature comprises at least one oblong opening that is elongate in a radial direction and that has a corresponding spacer passing therethrough.

3. A system according to claim 2, wherein the oblong opening opens out into the circumference of the armature.

4. A system according to claim 1, wherein the brake comprises three spacers each having one end engaged in a corresponding housing of the chassis, so as to enable the chassis to take up torque that is exerted on the brake during braking.

5. A system according to claim 1, wherein the motor drives an elevator.

6. A braking system for an electric motor, the braking system comprising:
   a chassis;

a first brake supported by the chassis, the first brake comprising:
- at least one brake disk connected via a fluted connection to a shaft driven by the motor;
- an armature that is movable in translation along an axis of rotation of the shaft;
- a plurality of armature-guiding spacers, at least one of the spacers being engaged at one end in a corresponding housing in the chassis, so as to enable the chassis to take up torque that is exerted on the brake during braking;
- a plurality of springs for urging the armature against the disk; and
- an electromagnet which, when powered, attracts the armature and moves it away from the disk against the action of the springs, a second brake juxtaposed with the first brake, the second brake comprising:
- a second brake disk connected via a fluted connection to the shaft driven by the motor,
- a second armature movable in translation along the axis of rotation of the shaft,
- a plurality of second armature-guiding spacers,
- a plurality of second springs for urging the second armature against the second disk, and
- a second electromagnet which, when powered, attracts the second armature and moves it away from the second disk against the action of the second springs.

7. A system according to claim 6, wherein each of the second spacers is engaged at one end in a corresponding housing of the yoke of the first brake, so as to enable said yoke to take up the torque that is exerted on the second brake during braking.

8. A system according to claim 6, wherein the braking system comprises threaded rods passing through the spacers of each brake and holding the two brakes in compression one against the other.

9. A system according to claim 8, wherein the threaded rods are screwed at one end into the chassis and enable nuts to be screwed onto their opposite ends to bear against the yoke of the second brake.

10. A system according to claim 6, wherein the yoke of the second brake comprises a housing enabling the end of the shaft driven by the motor to be received, and wherein said housing is closed at one end by a plug.

11. A braking system for an electric motor, the braking system comprising:
a chassis; and
at least one brake supported by the chassis, the brake comprising:
- a yoke,
- at least one brake disk connected via a fluted connection to a shaft driven by the motor;
- an armature that is movable in translation along an axis of rotation of the shaft;
- a plurality of armature guiding spacers, at least one of the spacers being engaged at one end in a corresponding housing in the chassis, so as to enable the chassis to take up torque that is exerted on the brake during braking, each spacer being screwed into the yoke and being hollow, rods passing through each of the spacers and fixing the at least one brake to the chassis;
- a plurality of springs for urging the armature against the disk; and
- an electromagnet which, when powered, attracts the armature and moves it away from the disk against the action of the springs.

12. A braking system for an electric motor, the braking system comprising:
a chassis; and
at least one brake supported by the chassis, the brake comprising:
- at least one brake disk connected via a fluted connection to a shaft driven by the motor;
- an armature that is movable in translation along an axis of rotation of the shaft;
- a plurality of armature guiding spacers, at least one of the spacers being engaged at one end in a corresponding housing in the chassis, each spacer comprising a hexagonal head which defines a shoulder coming into abutment against the chassis;
- a plurality of springs for urging the armature against the disk; and
- an electromagnet which, when powered, attracts the armature and moves it away from the disk against the action of the springs.

* * * * *